April 9, 1957 B. K. SMITH 2,788,442

PULSE BROADENER

Filed Oct. 6, 1954

INVENTOR.
BRUCE K. SMITH
BY James S. Shannon
AGEN
ATTORNEY

United States Patent Office
2,788,442
Patented Apr. 9, 1957

2,788,442

PULSE BROADENER

Bruce K. Smith, Devon, Pa., assignor to the United States of America as represented by the Secretary of the Air Force Application October 6, 1954, Serial No. 460,780

4 Claims. (Cl. 250—27)

(Granted under Title 35, U. S. Code (1952), sec. 266)

The invention described herein may be manufactured and used by or for the United States Government for governmental purposes without payment to me of any royalty thereon.

Pulse amplifiers of the tube and pulse transformer type amplifying variable duty cycle pulse trains as, for example, pulse trains representing binary numbers, are limited to handling pulses whose widths are no greater than approximately 50% of the information period. Operation at higher duty cycles results in differences between the first and later pulse wave shapes. It is the object of this invention to provide an amplifier of the above type in which pulse outputs up to 75% duty cycle are possible while maintaining uniformity of wave shape and without impairment of the pulse trailing edges.

The invention is applicable to pulse transformers having two outputs of opposite polarity. A condenser is connected between the two outputs in such a way as to be charged during the pulse time to a voltage approaching the combined voltages of the two output pulses. If it is desired to broaden the negative pulse, the circuit is arranged so that, starting with the trailing edge of the pulse, the discharge current of the condenser and the transient current following the positive pulse are allowed to flow in the negative pulse output circuit. The combined effect of the two transients is to broaden the negative pulse by about 50%. The positive output pulse may be similarly broadened by allowing the discharge current and the transient current following the negative pulse to flow in the positive pulse output circuit.

Figure 1:
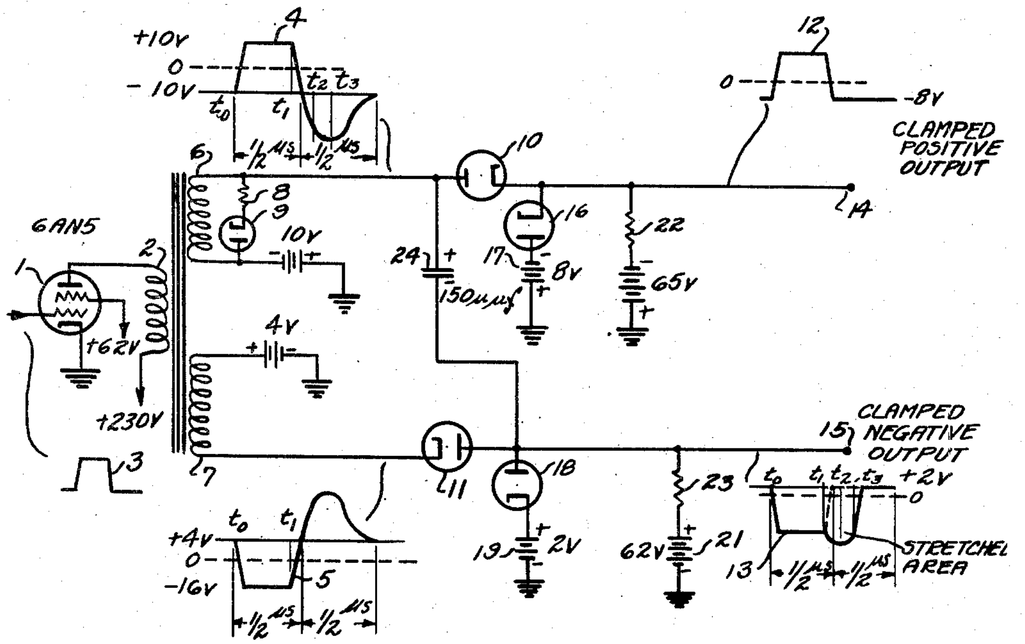
Figure 2:
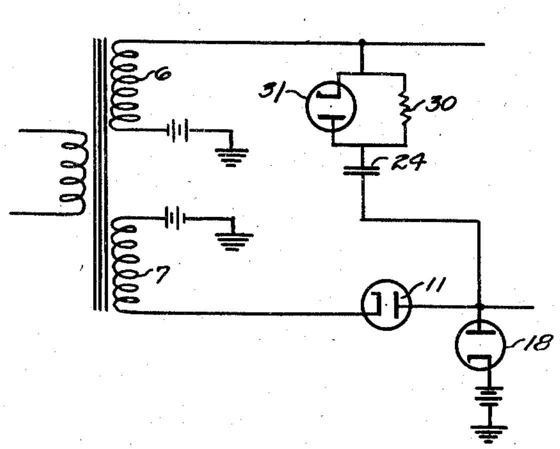

A more detailed description of the invention will be given in connection with the specific embodiment thereof shown in the accompanying drawing, in which Fig. 1 is a schematic diagram of a pulse amplifier employing the invention, and Fig. 2 is a modification of Fig. 1 to reduce the effect of the added capacitor on the pulse leading edge.

Referring to Fig. 1, the specific pulse amplifier shown is designed to supply positive pulses and negative inhibiting pulses to gating circuits in a digital computer. The amplifier comprises amplifier tube 1 having the primary winding 2 of a pulse transformer in its anode circuit. The application of a pulse 3 to the grid of tube 1 causes amplified pulses 4 and 5 of opposite polarity to appear across the secondary windings 6 and 7, respectively, of the transformer. The amplified pulses illustrated have a frequency of one megacycle per second, a duty cycle of 50% and an amplitude of 20 volts. The ½ microsecond pulse is followed by a critically damped sinusoidal ring, the damping being supplied by resistor 8 connected in series with diode 9 across secondary 6. Diodes 10 and 11 are for the purpose of decoupling the transformer from its load during overshoot so that it sees only its local damping network. The positive and negative output pulses 12 and 13 appearing at output terminals 14 and 15, respectively, are clamped at −8V and 2V by diode 16 and voltage source 17 in the case of the positive output, and by diode 18 and voltage source 19 in the case of the negative output. Voltage sources 20 and 21 and resistors 22 and 23 provide the necessary holding currents.

The negative pulse 13 is shown broadened by approximately 50%. This is accomplished in accordance with the invention by the addition of condenser 24 connected between the ungrounded end of the positive secondary 6 and output terminal 15. The manner of operation is as follows: During the interval from $t_0$ to $t_1$ condenser 24 charges to approximately the sum of the amplitudes of pulses 4 and 5, or to approximately 40 volts. The addition of condenser 24 causes no change in the waveform appearing at terminal 15 until time $t_1$, at which time the diode 11 decouples and the voltage at terminal 15 becomes a function of the trailing edge of pulse 4 added to the exponential voltage produced by condenser 24 discharging through secondary 6 and resistor 23. If the time constant of the condenser discharge circuit is adjusted to provide a discharge rate equal to the slope of the positive pulse overshoot at approximately 50% amplitude, occurring at $t_2$, then the sum of the effects of the two transients at terminal 15 will be negative and the resulting output waveform will be as shown at 13, leveling at $t_2$. From $t_2$ to $t_3$, the peak amplitude point of the overshoot, the sum increases gradually, and the stretched pulse amplitude returns to approximately its original value. At $t_3$ the two forces assume the same polarity and result in a very sharp trailing edge.

The positive pulse 12 may be broadened in the same manner by connecting condenser 24 between the ungrounded end of secondary 7 and terminal 14 instead of as shown in Fig. 1. In this case broadening is caused by the combined action of the condenser transient and the overshoot of negative pulse 5.

The effect of condenser 24 on the pulse leading edge, in circuits where such additional capacity might prove detrimental, can be considerably alleviated by the addition of resistor 30 and diode 31 as shown in Fig. 2. The time constant of condenser 24 and resistor 30 must be such that the condenser is able to acquire a dynamic charge during the pulse approaching the sum of the pulse amplitudes at the secondaries. The voltage drop across diode 31 should be small relative to the pulse amplitude during the stretching period.

I claim:

1. A pulse amplifier comprising an amplifier tube and a pulse transformer connected in its anode circuit, said pulse transformer having oppositely poled positive and negative secondary windings each having one terminal connected to a point of reference potential; a series circuit connected between the other terminal of said positive secondary winding and said point of reference potential comprising, in the order named, the anode of a diode, the cathode of said diode, a resistor, the negative terminal of a source of direct potential and the positive terminal of said source of potential; a series circuit connected between the other terminal of said negative secondary winding and said point of reference potential comprising, in the order named, the cathode of a diode, the anode of said diode, a resistor, the positive terminal of a source of direct potential and the negative terminal of said source of direct potential; a positive output terminal connected to the cathode of the diode in the series circuit associated with the positive secondary winding; a clamping diode having its cathode connected to said positive output terminal and its anode connected through a source of negative direct potential to said point of reference potential; a negative output terminal connected to the anode of the diode in the series circuit associated with the negative secondary winding; a clamping diode having its anode connected to said negative output terminal and its cathode connected through a source of positive potential to said point of reference potential; and a condenser connected between the said other terminal of one of said secondary windings and the output terminal associated with the other secondary winding.

2. Apparatus as claimed in claim 1 in which said condenser has connected in series therewith a resistor shunted by a diode, said diode being poled to conduct during discharge of said condenser.

3. A pulse broadener having a pulse transformer with a primary winding and two secondary windings; means for applying electrical pulses to said primary winding; means connecting one terminal of each secondary winding to a common point of reference potential such that the remaining two terminals of said secondary windings have opposite polarities relative to said point of reference potential; an output circuit connected to said point of reference potential and through a first unidirectional device to the remaining terminal of one of said secondary windings, said device being poled to permit conduction from said one secondary winding to said output circuit in the presence of a pulse and to decouple said one secondary winding from said output circuit during the transient appearing across said one secondary winding following said pulse; a damping resistor and a second unidirectional device connected in series across the other of said secondary windings, said second unidirectional device being poled to decouple said damping resistor from the secondary winding in the presence of a pulse and to couple said damping resistor across the secondary winding during the transient appearing across the secondary winding following said pulse for critically damping said transient; and a capacitor connected between the remaining terminal of said other of said secondary windings and a point between said first unidirectional device and said output circuit, the size of said capacitor being such that its discharge rate substantially equals the slope at half amplitude of said damped transient.

4. Apparatus as claimed in claim 3 in which said capacitor has connected in series therewith a resistor shunted by a diode, said diode being poled to conduct during discharge of said capacitor.

References Cited in the file of this patent

UNITED STATES PATENTS

| | | |
|---|---|---|
| 1,717,070 | Siegmund | June 11, 1929 |
| 2,439,223 | Schade | Apr. 6, 1948 |
| 2,452,013 | Friend | Oct. 19, 1948 |
| 2,570,014 | Schenau et al. | Oct. 2, 1951 |